США012552311B2

(12) United States Patent
Aigner et al.

(10) Patent No.: US 12,552,311 B2
(45) Date of Patent: Feb. 17, 2026

(54) METHOD FOR RESOLUTION-OPTIMIZED CONTROL OF LIGHTING MODULE FOR MOTOR VEHICLE LIGHT (71) Applicant: ZKW Group GmbH, Wieselburg (AT)

(72) Inventors: Clemens Aigner, St. Pölten (AT); Erik Haas, Rabenstein an der Pielach (AT)

(73) Assignee: ZKW Group GmbH, Wieselburg (AT)

( * ) Notice: Subject to any disclaimer, the term of this patent is extended or adjusted under 35 U.S.C. 154(b) by 39 days.

(21) Appl. No.: 18/799,079

(22) Filed: Aug. 9, 2024

(65) Prior Publication Data
US 2025/0074297 A1 Mar. 6, 2025

(30) Foreign Application Priority Data
Aug. 31, 2023 (EP) ..................................... 23194681

(51) Int. Cl.
*B60Q 1/50* (2006.01)
*F21S 43/00* (2018.01)
(Continued)

(52) U.S. Cl.
CPC ................ *B60Q 1/50* (2013.01); *F21S 43/15* (2018.01); *F21S 43/601* (2024.05); *H04N 9/3188* (2013.01); *B60Q 2400/50* (2013.01)

(58) Field of Classification Search
CPC ....... B60Q 1/50; B60Q 2400/50; F21S 43/15; F21S 43/601; H04N 9/3188
See application file for complete search history.

(56) References Cited

U.S. PATENT DOCUMENTS 11,754,251 B2 * 9/2023 Nakamoto .............. F21S 43/14
362/221
12,140,875 B2 * 11/2024 Van Weperen ....... G03F 7/7085
(Continued)

FOREIGN PATENT DOCUMENTS

CN 108917624 A * 11/2018 ............. G01B 11/06
CN 119062964 A * 12/2024 ............ F21S 41/635
(Continued)

OTHER PUBLICATIONS

Extended European Search Report for European Patent Application No. 23194681.5 dated Feb. 27, 2024 (9 Pages).
(Continued)

*Primary Examiner* — Adam D Houston
(74) *Attorney, Agent, or Firm* — Eversheds Sutherland (US) LLP (57) ABSTRACT

Method for resolution-optimized control of a light module (1) for a motor vehicle light (10), wherein the light module (1) is designed to emit segmented light distribution with individually controllable light segments (51), wherein the light module (1) comprises a deflection unit (4), with which a native resolution of the light module (1) can be visually increased by at least temporary beam deflection by means of the deflection unit (4), wherein the light module is controlled in such a way that in a first time range (T1), a first low-resolution image (A) is emitted by the light module (1), wherein in the first time range (T1), the first low-resolution image (A) is recurrently deflected by means of the deflection unit (4) in such a way that the first low-resolution image (A) is at least partially visually superimposed on itself in the first time range (T1).

17 Claims, 5 Drawing Sheets

(51) Int. Cl.
  *F21S 43/15*   (2018.01)
  *H04N 9/31*   (2006.01)

(56) References Cited

U.S. PATENT DOCUMENTS

| | | |
|---|---|---|
| 2020/0363707 A1 | 11/2020 | Hirakura |
| 2022/0268412 A1* | 8/2022 | Iwao ........................ F21S 41/25 |
| 2023/0166654 A1* | 6/2023 | Lee ........................ F21S 41/141 |
| 2023/0250933 A1* | 8/2023 | Gloss ........................ F21S 43/31 |
| | | 362/516 |
| 2024/0019097 A1* | 1/2024 | Joo ........................ B60Q 1/543 |
| 2025/0074297 A1* | 3/2025 | Aigner .................. F21S 43/601 |

FOREIGN PATENT DOCUMENTS

| | | | | |
|---|---|---|---|---|
| DE | 102021122252 A1 | | 3/2022 | |
| EP | 4394241 A1 | * | 7/2024 | ............. G06T 7/269 |
| EP | 4394242 A1 | * | 7/2024 | ............. G06T 7/269 |
| EP | 4517164 A1 | * | 3/2025 | ............. F21S 43/20 |
| JP | 2025036171 A | * | 3/2025 | ............. F21S 43/20 |
| KR | 20240148745 A | * | 10/2024 | ............. F21V 5/048 |
| WO | WO-2021170844 A1 | * | 9/2021 | ............... G06F 5/06 |

OTHER PUBLICATIONS

Sing et al., "Super-Resolution Projection: Leveraging the MEMS Speed to Double or Quadruple the Resolution," SPIE Proceedings, vol. 10932, 2019.

* cited by examiner

METHOD FOR RESOLUTION-OPTIMIZED CONTROL OF LIGHTING MODULE FOR MOTOR VEHICLE LIGHT

CROSS-REFERENCE TO RELATED APPLICATIONS

This application claims priority to European Patent Application No. 23194681.5.0, filed Aug. 31, 2023, which is incorporated herein by reference.

FIELD OF THE INVENTION

The invention relates to a method for resolution-optimized control of a light module for a motor vehicle light, wherein the light module is designed to emit segmented light distribution with individually controllable light segments, wherein the light module comprises a deflection unit, with which a native resolution of the light module can be visually increased by at least temporary beam deflection by means of the deflection unit.

BACKGROUND

Methods for controlling light modules have become known from the prior art, which enable a time-variable change in the light emission of individual segments of light distribution. The resolution is usually limited by the resolution of the light module in question. In order to achieve an increased visual resolution, methods have become known in which a native resolution of the light module can be visually increased with a deflection unit by at least temporary beam deflection by means of the deflection unit.

US 2020/0363707 discloses an optical device. The publication demonstrates that the resolution of the optical device can be increased with a visual superimposition of two different images. For this purpose, two different images are calculated from one input image. The two different images are output one after the other with a physically separate synchronisation signal for the deflection unit. Synchronisation is obviously very time-consuming and ties up resources.

SUMMARY OF THE INVENTION

It is therefore an object of the invention to provide a method to facilitate the resolution-optimized control of a light module.

This object is achieved with a method of the type mentioned in the introduction, wherein the method comprises the following steps:
a) receiving a setpoint image, wherein the setpoint image has a resolution that exceeds the native resolution of the light module;
b) converting the setpoint image received according to step a) into a first low-resolution image based on a first conversion rule, wherein this first low-resolution image is selected in such a way that it has the native resolution of the light module, wherein the first low-resolution image is also selected in such a way that an at least partial visual superimposition with itself produces an image impression more similar to the setpoint image than the reproduction of the first low-resolution image on its own,
c) controlling the light module, wherein it is controlled in such a way that in a first time range, the first low-resolution image converted according to step b) is emitted by the light module, wherein in the first time range, the first low-resolution image is recurrently deflected by means of the deflection unit in such a way that the first low-resolution image is at least partially visually superimposed on itself in the first time range.

The term "resolution" is to be understood to mean the sum of the light segments in the respective image. Therefore, "native resolution" refers to any resolution that is achieved by the sum of the individually controllable light segments for light emission. If, for example, the light segments are arranged in two rows and two columns and are individually controllable, this corresponds to a native resolution of 2×2, wherein each individually controllable light segment can also be referred to as a light pixel. The light module preferably has a native resolution of at least 2×2. It is particularly preferably a high-resolution light module for a motor vehicle light.

Within the scope of the current patent application, the term "unit" alone or in a composition, such as in "projection unit", "deflection unit", "module control unit" or "storage unit", does not necessarily mean a single element. The term can also include a plurality of elements, assemblies, building blocks, components or combinations thereof.

The resolution that is perceived by the human eye can be increased compared to the native resolution by the at least temporary or recurrent beam deflection by means of the deflection unit. The visual superimposition resulting from the at least temporary beam deflection therefore means a superimposition resulting from the inertia of the human eye.

Recurrent deflection means a deflection that causes the described visual superimposition of the first low-resolution image with itself for the duration of the first time range. The extent of the superimposition of the first low-resolution image with itself can be described using at least one deflection parameter.

The setpoint image can have a setpoint light distribution.

In terms of the issue of the similarity of images, a person skilled in the art is familiar with suitable algorithms for assessment. For example, mutual information (see e.g. keyword "mutual information") or structural similarity (see e.g. keyword SSIM—structural similarity index measure) can be used. There is extensive information on these terms online, for example, including in the online encyclopedia "Wikipedia".

In particular, it can be provided that the deflection unit is designed to deflect the first low-resolution image recurrently in the first time range at a frequency of at least 30 Hz, typically between 30 Hz and 160 Hz.

It can further be provided that the light module has individually controllable light segments, wherein the light distribution is segmented by the individually controllable light segments, which are arranged next to each other in a matrix with a resolution of at least two rows and two columns, substantially without gaps.

If necessary, it can be provided that a maximum deflection carried out by the deflection unit is designed such that compared to a non-deflected reference state, the deflected state has a vertical and a horizontal offset of substantially half a light segment width such that when the maximum amplitude of the deflection is reached—with the exception of edge light segments—each deflected light segment is substantially visually superimposed with four non-deflected light segments.

Substantially, the light segments—with the exception of edge light segments—visually overlap spatially by 25% each in the event of a recurring deflection. The perceived resolution can thus be approximately four times the native resolution. An edge light segment is understood as a light segment that is not surrounded on all sides by further light segments, but is free of adjacent light segments at least on one side. It thus constitutes an edge region of the image to be emitted.

In any case, the extent of the superimposition can be described using the at least one deflection parameter.

In particular, it can be provided that the deflection unit has a neutral position. This position can, but does not have to, be different from a zero position. In this neutral position, the deflection unit does not recurrently deflect the passing light. In the event that the deflection unit is not required or has to be switched off, emission of a low-resolution image is still guaranteed.

It can be provided that the first conversion rule comprises an at least approximate solution of a linear equation system, which linear equation system contains a set of linear equations containing information of the setpoint image with regard to the first low-resolution image in the at least partial superimposition with itself.

This preferred embodiment of the first conversion rule as an at least approximate solution preferably comprises an iterative solution of a linear equation system.

The linear equations can describe a relationship between each part of the setpoint image and each part of the first low-resolution image in the at least partial superimposition with itself.

The specified information of the setpoint image with reference to the first low-resolution image in the at least partial superimposition with itself can further contain the at least one deflection parameter.

For reasons of efficiency, it can be provided that the first conversion rule is executed by an external computing unit, wherein the first low-resolution image is preferably stored in a storage unit of the light module where it can be retrieved. Furthermore, it can advantageously be provided that in step b), the setpoint image received according to step a) is additionally converted into a second low-resolution image based on a second conversion rule, wherein the second low-resolution image is selected in such a way that it has the native resolution of the light module, wherein the second low-resolution image is also selected in such a way that on its own it has a more similar image impression to the setpoint image than the first low-resolution image, wherein in step c), in a second time range, the second low-resolution image is emitted by the light module, wherein in the second time range, the second low-resolution image is not deflected recurrently by means of the deflection unit.

The deflection unit can therefore be in the neutral position in the second time range.

The second conversion rule preferably comprises a scaling method, in which the second low-resolution image is converted entirely from information of the setpoint image. This scaling method can involve reducing the resolution of the setpoint image to the native resolution of the light module. This can be a "downsampling" method, for example. Furthermore, it can be a block processing method, for example, in which the values of all light segments of the second low-resolution image are calculated from the block-by-block averaging of the setpoint image.

It can be provided that the duration and/or the start time of the first time range and the duration and/or the start time of the second time range is determined by at least one control parameter, wherein the at least one control parameter contains information on at least one of the following criteria: setpoint light function, ambient temperature, ambient brightness, light module state, vehicle speed.

For reasons of efficiency, it can be provided that the second conversion rule is executed by an external computing unit.

In particular, it can be provided that the first low-resolution image converted according to step b) and the second low-resolution image converted according to step b) are stored in a storage unit where they can be retrieved before step c) in a partial step b1).

This storage unit can preferably be included in the light module.

It can further be provided that the setpoint image has at least one continuous light-dark gradient, the setpoint image preferably has a plurality of continuous light-dark gradients, which together form a symbol.

The invention further relates to a light module for a motor vehicle light, wherein the light module is designed to emit segmented light distribution, wherein the light module comprises a deflection unit, with which a visually perceptible resolution of the light distribution produced by the light module can be increased compared to the native resolution of the light module, wherein the light module is designed to be controlled at least according to step c) of the aforementioned method.

It can be provided that the light module further comprises a storage unit and a module control unit, wherein the storage unit is designed to store at least one first low-resolution image and at least one second low-resolution image, wherein the module control unit is designed to retrieve the first low-resolution image and the second low-resolution image from the storage unit and to emit a light control signal to the light source such that either the first low-resolution image or the second low-resolution image is emitted by the light module, wherein the module control unit is further designed to control the deflection unit in such a way that this recurrently deflects the first low-resolution image when the first low-resolution image is emitted by the light module, wherein the module control unit is further designed to control the deflection unit in such a way that this does not recurrently deflect the second low-resolution image when the second low-resolution image is emitted by the light module.

The invention further relates to a motor vehicle having such a light module, wherein the motor vehicle and/or the light module is/are designed to at least partially carry out the aforementioned method.

All device features named in the method can also form part of the light module for a motor vehicle light, unless stated otherwise. Conversely, all device features named in conjunction with the light module can also form part of the aforementioned method. The light module can relate both to a signalling light and a light module in a motor vehicle headlight. The light module is preferably designed for use in a motor vehicle light, in particular in a signalling light or in a motor vehicle headlight. Accordingly, the light module can also be part of the aforementioned devices.

BRIEF DESCRIPTION OF THE DRAWINGS

The invention is outlined in more detail below based on exemplary and non-limiting embodiments, which are illustrated in the figures. In the figures.

DETAILED DESCRIPTION

Figure 1:
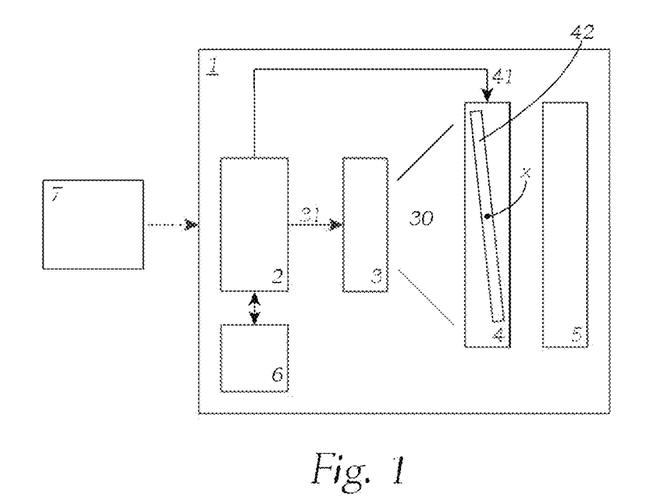
FIG. 1 shows a schematic illustration of a light module.

FIG. 1 shows a schematic illustration of a light module 1 for a motor vehicle light 10. The light module 1 is designed to emit segmented light distribution with individually controllable light segments. The light module 1 comprises a module control unit 2, a storage unit 6, a light source 3, a deflection unit 4 and a projection unit 5. The storage unit 6 preferably contains an electronic memory. FIG. 1 also shows an external computing unit 7.

A wide variety of techniques are already known for generating segmented light distribution. These include in particular spatial modulation by means of LEDs (light-emitting diodes) arranged in a matrix, spatial light modulation by means of an LCD (liquid crystal display), or spatial light modulation by means of DLP (digital light processing) or DMD (digital mirror device). Alternatively, light beam modulation techniques have also become known, i.e. scanning systems that scan light beams or light rays with a frequency that is imperceptible to the human eye onto an area such that freely variable light distributions are created. The high-resolution light modules known today already allow resolutions with several thousand individually switchable and dimmable light segments, preferably arranged in an aspect ratio of 1:4, wherein the larger extension extends horizontally.

The terms horizontal and vertical can refer to the intended installation position of the light module 1, wherein the only essential aspect is that horizontal and vertical refer to orientations that are orthogonal to each other.

The light source 3 shown in FIG. 1 can comprise several elements. For example, the light source 3 comprises a light-emitting element and a downstream spatial modulator (not shown), such as an LCD, DMD or DLP for example. The light source 3 preferably comprises an array with at least two LEDs, wherein each LED can be controlled individually. The light source 3 particularly preferably comprises an array with more than 1000 individually controllable LEDs, which are arranged in an array with an aspect ratio of 1:4. Furthermore, the light source 3 can alternatively comprise a combination of a light-emitting element, a collimator and a light beam modulator, which scans collimated light of the light-emitting element in a scanning form at a frequency that is imperceptible to the human eye onto an area. A light conversion element can be arranged in this area. The light source 3 can thus consist of a plurality of elements. For example, additional elements such as optical lenses or reflectors can be provided, but are not shown for the sake of clarity.

It is fundamental that a light beam 30 is emitted from the light source 3, which has at least two light segments in at least one plane perpendicular to the light propagation direction of the light beam 30 that can have different light intensities. This light beam 30 therefore corresponds at least partly to a low-resolution image A, B in at least one plane perpendicular to the light propagation direction of the light beam 30.

For this purpose, the light source 3 can receive a light control signal 31 and emit a light beam 30 as a function of the light control signal 31. For this purpose, the light control signal 31 can be at least partly representative of the light beam 30 emitted by the light source 3. The module control unit 2 can be designed to emit the light control signal 31.

The light control signal 31 can be designed at least as part of an image signal containing the low-resolution image.

The light beam 30 emitted by the light source 3 is projected by the projection unit 5 within a projection angular range P in front of the light module 1. This means that a specific light distribution or a specific low-resolution image is emitted by the light module 1. Accordingly, this results in a projection 50 of a specific low-resolution image within a projection angular range P in front of the light module 1. Such a projection unit 5 usually comprises a plurality of optical elements, in particular lenses. For the sake of clarity, this plurality of optical elements is not shown.

The projection angular range P is determined by the aperture of the projection unit 5. The projection angular range P therefore corresponds to the maximum possible projection cone of the projection unit 5. Such a projection cone refers to a cone in the mathematical sense, wherein all sub-variants can also be included. Examples of sub-variants include pyramid cones or truncated cones.

Figure 2A:
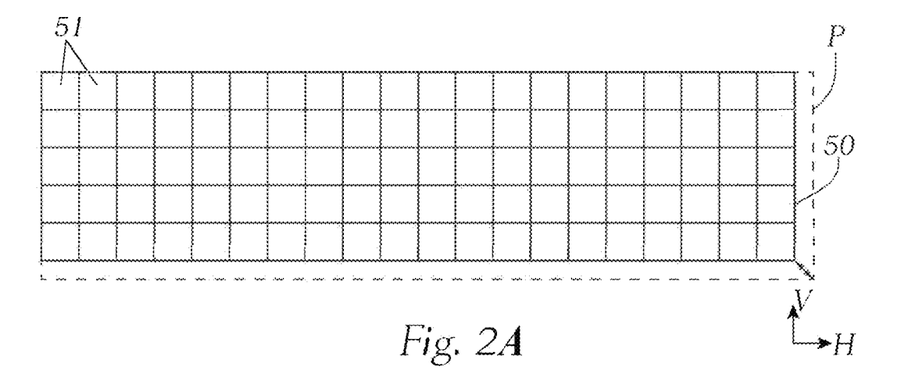
FIG. 2A shows a schematic illustration of a low-resolution image.

As shown in FIG. 2A, the projection 50 of a low-resolution image comprises, for example, an array of light segments 51 with five rows and twenty columns. The native resolution shown of the light module 1 therefore comprises 20×5 light segments 51. Although only one hundred light segments 51 are shown, the light source 3 can be designed in such a way that several thousand light segments 51 are projected or emitted by the light module 1 within the projection angular range P.

The deflection unit 4 shown in FIG. 1 can now temporarily deflect the light beam 30 emitted by the light source 3 and thus also the projection 50. This means that the native resolution of the light module 1 can be visually increased by at least temporary beam deflection by means of the deflection unit 4.

The deflection unit 4 is preferably arranged in the beam path of the light beam 30 between the light source 3 and at least part of the projection unit 5. At least part of the projection unit 5 means that it can consist of a plurality of optical elements, as explained above, between which the deflection unit 4 can be arranged.

The deflection unit 4 can receive a deflection control signal 41 and deflect the light beam 30 emitted by the light source 3 as a function of the deflection control signal 41. This means that the projection 50 of a low-resolution image can be deflected temporarily within the projection angular range P as a function of the deflection control signal 41. The module control unit 2 can be designed to emit the deflection control signal 41.

The deflection unit 4 can comprise a glass plate 42, which consists of a material that is transparent for the emitted light beam 30 from the light source 3. This glass plate 42 can be designed as a plane-parallel plate and be mounted so as to pivot about at least one pivot axis x by a corresponding mechanical suspension, wherein this pivot axis x is preferably perpendicular to the light propagation direction of the light beam 30 emitted by the light source 3. For example, the deflection unit 4 can further have an electromagnetic actuator (not shown), which temporarily pivots the glass plate 42 about the at least one pivot axis x depending on the deflection control signal 41. By pivoting, the angle of entry of the light beam 30 into the glass plate can be temporarily changed, whereby the light beam 30 can be deflected as the light passes through the glass plate 42 parallel to the light propagation direction of the light beam 30 in accordance with the refraction. As a result, the projection 50 of the light beam 30 emitted by the light source or of a low-resolution image can be deflected in front of the light module 1. This is explained in more detail in FIG. 2b.

A person skilled in the art will be familiar with a wide variety of ways to create such a deflection unit 4. For example, prisms (not shown) are also conceivable, which can deflect the projection 50 of the light beam 30 or the low-resolution image within the projection angular range P by changing the lateral position (in relation to the light propagation direction of the light beam 30) and thus also by refraction. Reflective solutions of a deflection unit 4 are also possible.

Figure 2B:
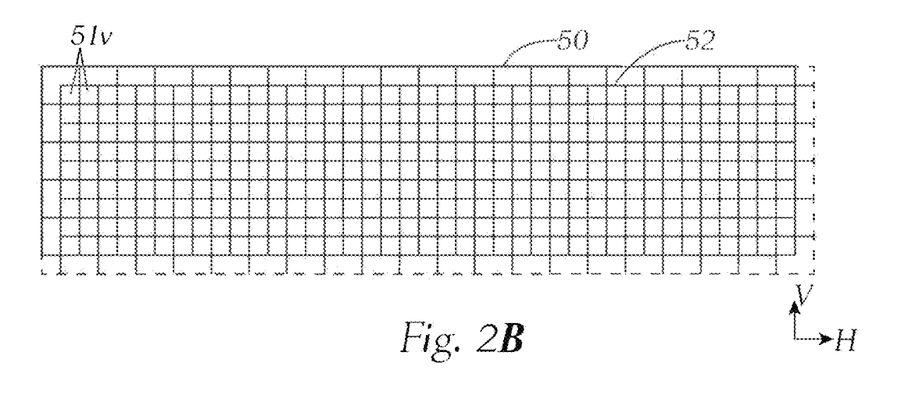
FIG. 2B shows a schematic illustration of the superimposition of two low-resolution images.

The illuminable angular range is expanded, as shown in FIG. 2B, by at least temporarily deflecting the projection 50 of a low-resolution image within the projection angular range P. In particular, with a sufficiently quick and recurrent deflection or with a sufficiently great deflection frequency of at least 30 Hz, preferably between 30 Hz and 160 Hz, a deflected projection 52 and a non-deflected projection 50 can be visually superimposed. This allows visual light segments 51v to be formed, which visually increase the resolution of the light module 1. For the sake of simplicity, the term "superimposed" is used, although it is clear that the superimposition results from the inertia of the human eye.

An at least temporary deflection of the projection 50 within the projection angular range P therefore means the displacement of the projection 50 in the possible projection cone, i.e. in the angular space resulting from the projection unit 5. The projection angular range P preferably has a horizontal and a vertical extension, wherein the horizontal extension can be greater than the vertical extension. By way of example, the horizontal extension covers an angular range of no more than 50° and the vertical extension covers an angular range of no more than 20°.

For the purpose of this description, the non-deflected projection 50 and the deflected projection 52 respectively show the projection of the same low-resolution image. A visual superimposition of the low-resolution image with itself therefore results from the visual superimposition of a deflected projection 50 and a non-deflected projection 52 of the same low-resolution image. The extent of the superimposition of the low-resolution image with itself can be described using at least one deflection parameter.

The maximum deflection by the deflection unit 4 is designed in the present case such that compared to the non-deflected projection 50, the deflected projection 52 has a vertical and horizontal offset of substantially half a light segment width. Thus, with the maximum deflection shown here, each light segment 51—with the exception of edge light segments—is superimposed with four non-deflected light segments 51 of the same low-resolution image. The perceived resolution can thus be approximately four times the native resolution.

Figure 3:
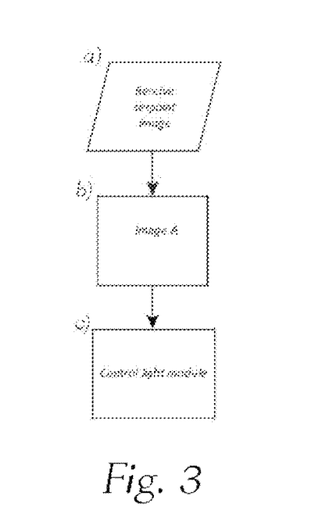
FIG. 3 shows a first flowchart according to the method described.

FIG. 3 shows a first flowchart. In this first flowchart, a setpoint image S is received in a first step a). This setpoint image S has a resolution that exceeds the native resolution of the light module 1. The setpoint image S can be contained in an image signal. The setpoint image S can also form part of a larger image, which larger image has a higher resolution than the setpoint image S. This means that the setpoint image S can form a section of a larger image.

In subsequent step b), the setpoint image S received according to step a) is converted into a first low-resolution image A according to a first conversion rule. This first low-resolution image A is selected in such a way that it has the native resolution of the light module 1. The first low-resolution image A is also selected in such a way that an at least partial visual superimposition with itself produces an image impression more similar to the setpoint image S than the reproduction of the first low-resolution image A on its own.

The first conversion rule can be executed by the module control unit 2. Accordingly, the module control unit 2 can be designed to execute the first conversion rule. However, the first conversion rule is preferably executed by an external computing unit 7. The external computing unit 7 can therefore be designed to receive the setpoint image S according to step a). The external computing unit 7 can further be designed to execute the first conversion rule according to step b). The external computing unit 7 is preferably not part of the light module 1.

It can be provided that the first low-resolution image A is stored in the storage unit 6 of the light module 1 where it can be retrieved. If the first conversion rule is executed by the external computing unit 7, this external computing unit 7 can be designed to store the first low-resolution image A in the storage unit 6 of the light module 1 where it can be retrieved. The module control unit 2 can be designed to retrieve the first low-resolution image A stored in the storage unit 6.

The first conversion rule preferably comprises an at least approximate solution of a linear equation system. This equation system comprises a set of linear equations and can be written in the form $Sv=Km \cdot Av$. "$Km \cdot Av$" corresponds to a matrix-vector multiplication. Sv designates a vector with a number of setpoint light intensity values, which number of setpoint light intensity values corresponds to the resolution of the setpoint image S. For a setpoint image resolution of 40×10, the vector Sv therefore comprises four hundred components. The linear equation system therefore comprises four hundred equations in the present case. Av also designates a vector with a number of desired light intensity values, which number of desired light intensity values corresponds to the resolution of the first low-resolution image A. The approximate solution of the linear equation system therefore comprises one hundred desired light intensity values in the present case. The partial superimposition of the first low-resolution image A with itself results in a relationship between the desired light intensity values and the setpoint light intensity values. This relationship is described using a connection matrix Km.

The connection matrix Km therefore describes the effect of each light segment 51 in the partial visual superimposition with the neighbouring light segments 51 on each individual setpoint light intensity value. Accordingly, the connection matrix Km corresponds to a matrix with four hundred times one hundred elements.

The set of linear equations, i.e. the number of them, therefore depends on the resolution of the setpoint image S and the resolution of the first low-resolution image A or the native resolution of the light module 1.

The vector Sv with the number of setpoint light intensity values, and the connection matrix Km can together be referred to as "information of the setpoint image S with reference to the first low-resolution image A in the at least partial superimposition with itself".

The connection matrix Km can be calculated or measured.

If the connection matrix Km is calculated, the specified information of the setpoint image S further has the at least one deflection parameter. In the present example, two deflection parameters are provided, which describe the vertical and horizontal offset by substantially half a light segment width.

When the connection matrix Km is measured, each light segment 51 can be individually activated, for example, in order to record the effects of each individual light segment 51 in the recurrently deflected form on all or at least some of the corresponding setpoint light intensity values.

An embodiment of the first conversion rule as an at least approximate solution of the linear equation system can comprise corresponding equalization and/or regularization methods. The preferred embodiment of the first conversion rule as an at least approximate solution preferably comprises an iterative solution of a linear equation system.

In a further step c), the light module 1 is controlled. It is controlled in such a way that in a first time range T1) the first low-resolution image A converted according to step b) is emitted by the light module 1. The module control unit 2 can emit a corresponding light control signal 31 to the light source 3 such that a corresponding light beam 30 is emitted by the light source 3. This light beam 30 is, as described, emitted by the projection unit 5 in front of the light module 1 in the form of a projection 50. In this context, this projection 50 corresponds to the first low-resolution image A. The first low-resolution image A is preferably continuously emitted in the first time range T1 by the light module 1.

If the first low-resolution image A is stored in a storage unit 6 of the light module 1 where it can be retrieved, the module control unit 2 can be designed to retrieve the first low-resolution image A from the storage unit 6 and emit a light control signal 31 based thereon.

Furthermore, in the first time range T1, the first low-resolution image A is recurrently deflected by means of the deflection unit 4 such that the first low-resolution image A is at least partially visually superimposed on itself in the first time range T1. The module control unit 2 can send a corresponding deflection control signal 41 to the deflection unit 4 such that the first low-resolution image A or its projection 50 is recurrently deflected. For this purpose, the deflection control signal 41 can also be recurrently sent to the deflection unit 4. The recurrent deflection of the first low-resolution image A is preferably active throughout the first time range T1.

The output of the light control signal 31 for emitting the first low-resolution image A and/or the output of the deflection control signal 41 for activating the recurrent deflection by the deflection unit 4 can start the first time range T1. The output of a light control signal 31 for emitting a low-resolution image different from the first low-resolution image A and/or the output of a deflection control signal 41 for deactivating the recurrent deflection by the deflection unit can end the first time range T1.

Figure 4A:
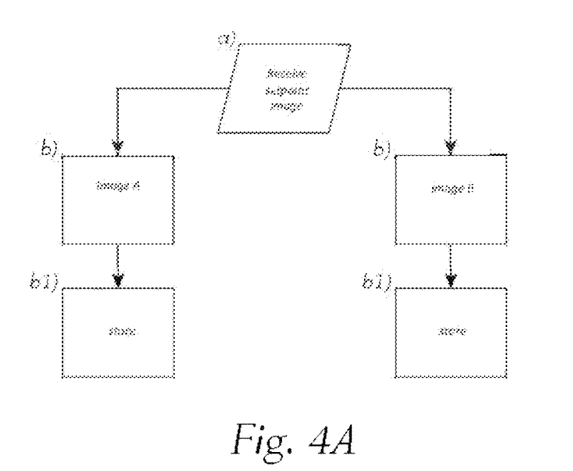
FIG. 4A shows a second flowchart according to a further embodiment of the method.

FIG. 4A shows a second flowchart. This second flowchart shows a further embodiment of the method, wherein in a first step a), a setpoint image S is once again received. This setpoint image S has a resolution that exceeds the native resolution of the light module 1. In subsequent step b), the setpoint image S received according to step a) is converted into a first low-resolution image A according to a first conversion rule. The conversion of the setpoint image S into the first low-resolution image A has already been described with reference to FIG. 3, so no further details are given here.

Furthermore, in the same subsequent step b), the setpoint image S received according to step a) is converted into a second low-resolution image B according to a second conversion rule. The second low-resolution image B is selected in such a way that it has the native resolution of the light module 1. Furthermore, the second low-resolution image B is selected in such a way that on its own it has a more similar image impression to the setpoint image S than the first low-resolution image A.

The second conversion rule can be executed by the module control unit 2. Accordingly, the module control unit 2 can be designed to execute the second conversion rule. However, the second conversion rule is preferably executed by the external computing unit 7. The external computing unit 7 can therefore be designed to execute the second conversion rule.

The second conversion rule preferably comprises a scaling method. This scaling method preferably involves reducing the resolution of the setpoint image S to the native resolution of the light module 1, wherein the resulting second low-resolution image B is formed entirely from the information of the setpoint image S. Accordingly, the scaling method can, for example, be a known "downsampling" method-which, for example, discards every second setpoint light intensity value of the setpoint image S in order to then form the light intensity values of the second low-resolution image B from the remaining setpoint light intensity values. Furthermore, it is also possible to use block processing methods in which setpoint light intensity values of the setpoint image S are grouped together in blocks in order to form the individual light intensity values of the second low-resolution image B. Grouping setpoint light intensity values together in blocks means, for example, that the average of four neighbouring setpoint light intensity values—i.e. a 2×2 block—is taken in order to then calculate a light intensity value of the second low-resolution image B in each case. As an alternative to averaging, other methods can also be used, such as finding the median value. As a wide variety of scaling methods are known to those skilled in the art, they will not be discussed in detail.

In a further step b1), the first low-resolution image A converted in the preceding step b) and the converted second low-resolution image B can be stored in a storage unit 6 where they can be retrieved. The module control unit 2 can be designed to retrieve the low-resolution images A, B stored in the storage unit 6.

If the second conversion rule is executed by the external computing unit 7, this external computing unit 7 can be designed to store the second low-resolution image B in the further step b1) in the storage unit 6 of the light module 1 where it can be retrieved.

If the setpoint S has a continuous light-dark gradient, in particular if the setpoint S has a continuous light-dark gradient in the form of a symbol (will be described later), it can be advantageous to convert the first low-resolution image A and the second low-resolution image B before the intended use of the light module 1. In particular if a high computing power is required to convert the low-resolution images A, B from the setpoint image S, it may be expedient to convert them before the intended use of the light module 1. In this case too, the previously converted low-resolution images A, B are, as described, stored in a storage unit 6 where they can be retrieved. The intended use of the light module 1 can, for example, include the preferred use of the light module 1 in a motor vehicle light 10.

Figure 4B:
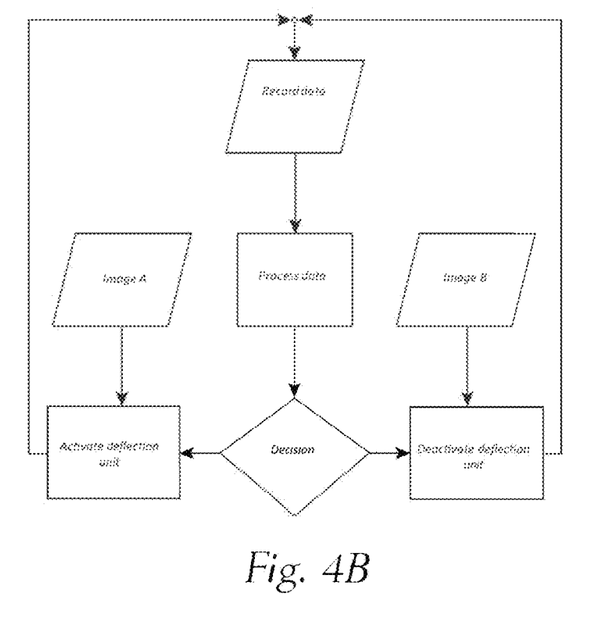
FIG. 4B shows a third flowchart according to the further embodiment of the method.
Figure 4C:
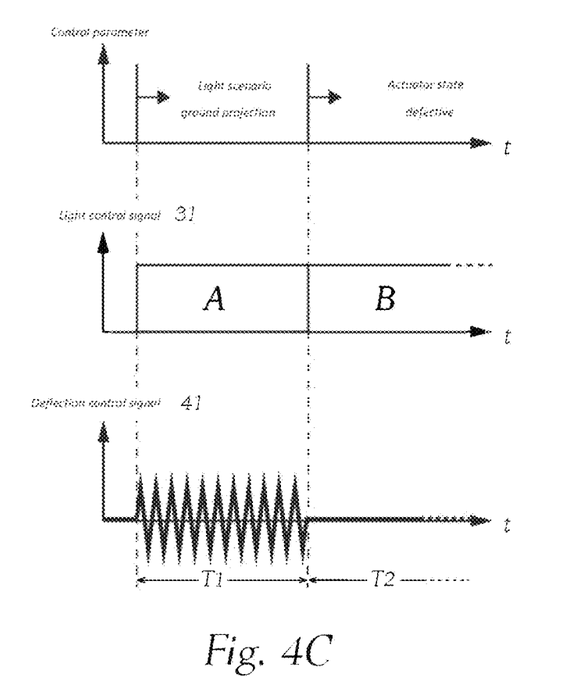
FIG. 4C shows a time chart according to the further embodiment of the method.

FIG. 4B shows a third flowchart. This third flowchart is described alternately with reference to FIG. 4C. FIG. 4C shows a time chart of the further embodiment of the method with a first time range T1 and a second time range T2. The time chart further shows a light control signal 31 and a deflection control signal 41.

The third flowchart relates to a motor vehicle 100 having a corresponding light module 1. Data from the motor vehicle 100 is continuously processed. The module control unit 2 can be designed to receive and process corresponding control parameters with the data from the motor vehicle 100 and to emit a light control signal 31 and a deflection control signal 41 based thereon. These data from the motor vehicle 100 can comprise information on at least one of the following criteria:

setpoint light function
ambient temperature
ambient brightness
light module state
vehicle speed The setpoint light function criterion can comprise a description of the required light scenario. By way of example, the required light scenario can be a dynamic ADB function (Adaptive Driving Beam) or a ground projection. A ground projection means, for example, the presence of a setpoint image S with a plurality of continuous light-dark gradients C, which together form a symbol. However, the required light scenario is not limited to the examples cited. It is also possible for the required light scenario to comprise a combination of a dynamic ADB function and a ground projection.

The ambient temperature can comprise the ambient temperature of the motor vehicle 100, the ambient temperature of the motor vehicle light 10, the ambient temperature of the light module 1 and/or preferably the ambient temperature of the deflection unit 4. The ambient temperature means, for example, the direct temperature of the object mentioned.

The ambient brightness can comprise the ambient brightness of the motor vehicle 100.

The light module state can comprise the state of one or more components of the light module 1. For example, the light module state comprises an actuator state or a storage unit state. The actuator state can describe the state of the deflection unit 4. The actuator state could, for example, assume the state of defective or non-defective. A defective actuator state could, for example, describe the state of a deflection unit 4 which cannot carry out proper recurrent beam deflection. The storage unit state can describe the state of the storage unit 6.

The vehicle speed can comprise the speed of the motor vehicle 100.

According to the third flowchart, the data from the motor vehicle 100 are processed accordingly in order to obtain a basis for a decision to activate or deactivate the recurrent beam deflection by the deflection unit 4, and to emit the first low-resolution image A or the second low-resolution image B.

If, for example, a ground projection is required as a light scenario in operation, the previously stored first low-resolution image A can be retrieved by the module control unit 2 and a corresponding light control signal 31 can be sent to the light source 3 according to the further embodiment of the method. Furthermore, the module control unit 2 can send a corresponding deflection control signal 41 to the deflection unit 4 in order to activate the recurrent beam deflection by the deflection unit 4.

The output of the light control signal 31 for emitting the first low-resolution image A and/or the output of the deflection control signal 41 for activating the recurrent deflection by the deflection unit 4 can start the first time range T1 and, if applicable, end the second time range T2—if this has already been started before. The key aspect is that in the first time range T1, the first low-resolution image A is emitted by the light module 1 and this first low-resolution image A is recurrently deflected by means of the deflection unit 4 in the first time range T1.

If, for example, there is a defective actuator state, the previously stored second low-resolution image B can be retrieved by the module control unit 2 and a corresponding light control signal 31 can be sent to the light source 3 according to the further embodiment of the method. Furthermore, the module control unit 2 can send a corresponding deflection control signal 41 to the deflection unit 4 in order to end any recurrent beam deflection by means of the deflection unit 4.

The output of the light control signal 31 for emitting the second low-resolution image B and/or the output of the deflection control signal 41 for deactivating the deflection unit 4 can start the second time range T2 and, if applicable, end the first time range T1—if this has already been started before. The key aspect is that in the second time range T2, the second low-resolution image B is emitted by the light module 1 and this second low-resolution image B is not recurrently deflected by means of the deflection unit 4 in the second time range T2.

The duration and/or the start time of the first time range T1 and the duration and/or the start time of the second time range T2 can thus be determined by at least one control parameter, wherein the at least one control parameter contains information on at least one of the aforementioned criteria. This of course requires the light module 1 itself to be activated. A deactivated light module 1 or a deactivated motor vehicle light 10 or a light module 1 not activated due to other influences does not allow for such time ranges T1, T2 and is not addressed here, although it is clear that the light module 1 to be deactivated due to other influences will necessarily end a previously existing first time range T1 or a previously existing second time range T2.

The start of a second time range T2 is not linked to the existence of a previous first time range T1. Neither is the start of a first time range T1 linked to the existence of a previous second time range T2. A plurality of first time ranges T1 can also be started in succession. A plurality of second time ranges T2 can also be started in succession. A first time range T1 and a second time range T2 can also be alternately started several times in succession.

The ambient temperature can, for example, be processed in such a way that an ambient temperature of the actuator unit 4 up to an upper limit value leads to emission of the first low-resolution image A with recurrent beam deflection and an ambient temperature of the actuator unit 4 above the upper limit value leads to emission of the second low-resolution image B without recurrent beam deflection. The upper limit value of the ambient temperature of the actuator unit 4 can be between 40° C. and 85° C.

The ambient brightness can, for example, be processed in such a way that an ambient brightness up to an upper limit value leads to emission of the first low-resolution image A with recurrent beam deflection and an ambient brightness above the upper limit value leads to emission of the second low-resolution image B without recurrent beam deflection. The upper limit value of the ambient brightness can be between 1000 lux and 7000 lux.

The vehicle speed can be processed in such a way that a vehicle speed up to an upper limit value leads to emission of the first low-resolution image A with recurrent beam deflection and a vehicle speed above the upper limit value leads to emission of the second low-resolution image B without recurrent beam deflection. The upper limit value of the vehicle speed can be between 2 and 30 km/h.

Figure 5:
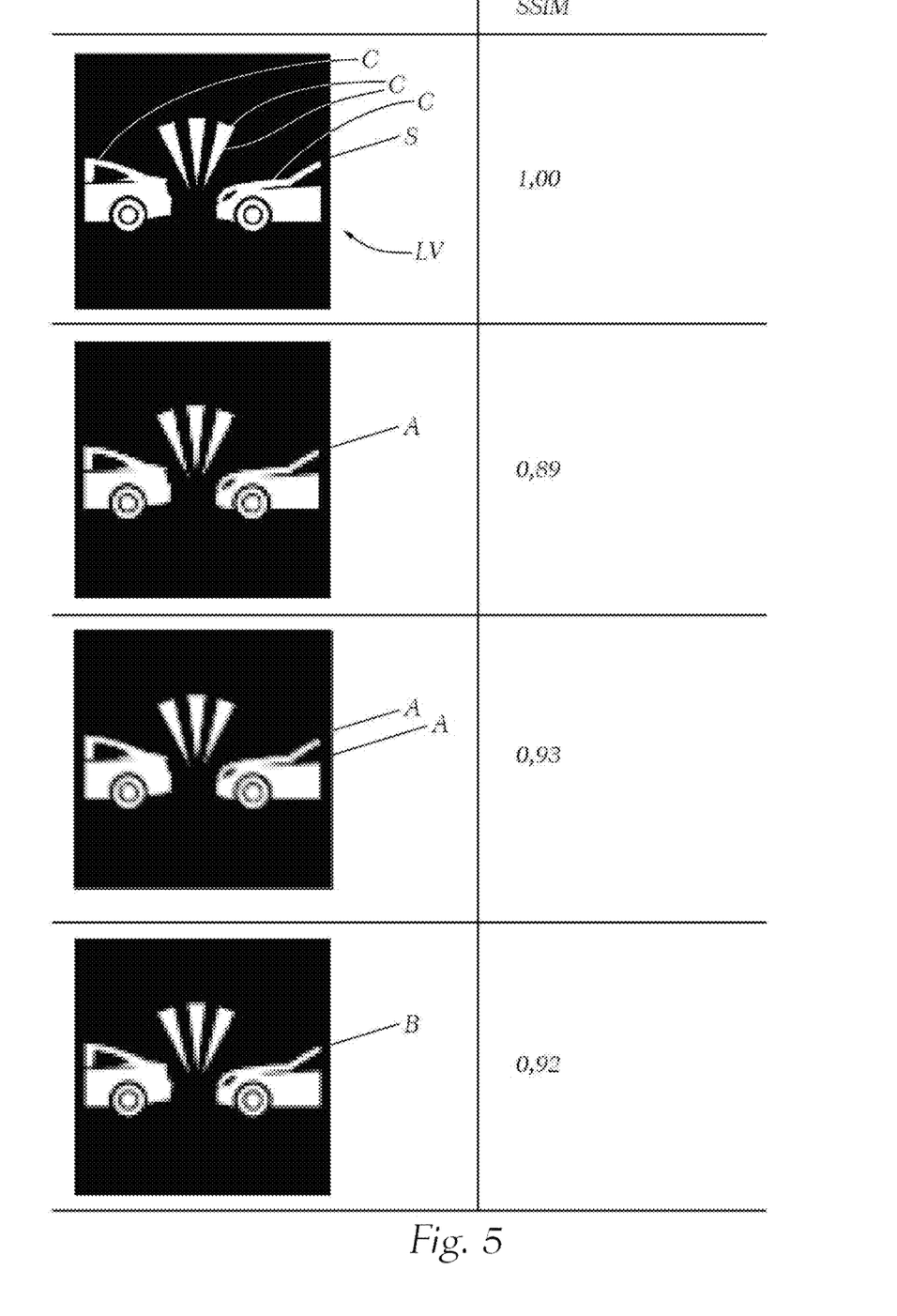
FIG. 5 shows a comparison of setpoint image, first low-resolution image, first low-resolution image in the at least partial superimposition with itself and second low-resolution image.

FIG. 5 shows a comparison of an exemplary setpoint image S, a first low-resolution image A converted therefrom, the low-resolution image A superimposed on itself and a second low-resolution image B converted from the setpoint image S.

Although some of the reference numerals used in this description of the figure are the same as those used in the previous descriptions of the figures, the design may differ in part. For example, other resolutions are shown for the sake of simpler visualization. The aspects described here are therefore by no means to be distinguished from the aspects already mentioned, but rather show the versatile applicability of the invention, which is defined by the entire scope of protection of the claims.

The setpoint image S has an exemplary setpoint light distribution LV here. This exemplary setpoint light distribution LV comprises a plurality of continuous light-dark gradients C, which together form a symbol. The continuous light-dark gradients C are seamless dividing lines between light areas and dark areas. The transition between a light area and a dark area can also be fluid. The setpoint image S shown in the form of a setpoint light distribution LV has a resolution that exceeds the resolution of the light module 1. Specifically, the setpoint image S shown in this figure has a resolution of 160×160. The setpoint image S shown therefore comprises 160×160 setpoint light intensity values.

Furthermore, a first low-resolution image A converted according to the method is shown. This first low-resolution image A has a resolution of 80×80. The resolution of 80×80 would correspond to the resolution of the light module 1 in the present case. The low-resolution image A shown therefore comprises 80×80 light intensity values.

According to the method, this first low-resolution image A is emitted by the light module 1 and recurrently deflected by means of the deflection unit 4. The resulting superimposition of the first low-resolution image A with itself is shown in this figure in the third image from the top. The recurrent beam deflection increases the resolution perceptible to the human eye compared to the native resolution of 80×80. The extent of the deflection corresponds substantially to a vertical and horizontal offset of half a segment width in the present case.

A comparison of the first low-resolution image A shown here and converted using the first conversion rule with the setpoint image S shows a structural similarity of 0.89. By contrast, a comparison of the setpoint image S with the low-resolution image A visually superimposed on itself shows a structural similarity of 0.93. Consequently, the image impression of the first low-resolution image A visually superimposed on itself is more similar to the setpoint image S than the reproduction of the first low-resolution image A on its own. Similarity is assessed here on the basis of structural similarity (SSIM—structural similarity index measure), which in some cases requires scaling to a corresponding resolution. However, other suitable algorithms are also known to compare images.

Furthermore, a second low-resolution image B converted according to the further embodiment of the method is shown. This second low-resolution image B also has a resolution of 80×80.

According to the further embodiment of the method, this second low-resolution image B is emitted by the light module 1 and not recurrently deflected by means of the deflection unit 4. This does not result in a superimposition of the second low-resolution image B with itself. A comparison of the second low-resolution image B shown here with the setpoint image S shows a structural similarity of 0.92. Consequently, the second low-resolution image B on its own has a more similar image impression to the setpoint image S than the first low-resolution image A.

Figure 6:
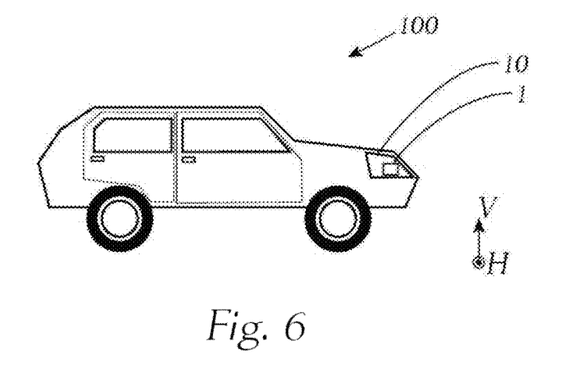
FIG. 6 shows a motor vehicle having such a light module.

FIG. 6 finally now shows a motor vehicle 100 having a light module 1 for a motor vehicle light 10. The light module 1 is in the intended installation position here. The motor vehicle 100 and/or the light module 1 is/are designed for at least partial control of the present method. The motor vehicle 100 can be designed to carry out a first part of the method, for example step a) and step b). The light module 1 is designed to be controlled at least according to step c) of the method. The motor vehicle 100 and/or the light module 1 can also be designed to carry out all the steps of the method. The external computing unit 7 is preferably designed to carry out step a) and step b) of the method, wherein the external computing unit is not part of the light module 1.

The invention is not limited to the embodiments of the method shown, but is defined by the entire scope of protection of the claims. Individual aspects of the invention or embodiments may also be adopted and combined with each other. Any reference numbers in the claims are exemplary and merely serve to make the claims easier to read, without limiting them.

REFERENCE LIST

1 light module
2 module control unit
3 light source
4 deflection unit
5 projection unit
6 storage unit
7 external computing unit
10 motor vehicle light
30 light beam
31 light control signal
41 deflection control signal
42 glass plate
50 projection
52 deflected projection
100 motor vehicle
A first low-resolution image
B second low-resolution image
C light-dark gradients
LV setpoint light distribution
P projection angular range
S setpoint image
x pivot axis

The invention claimed is:

1. A method for resolution-optimized control of a light module (1) for a motor vehicle light (10), wherein the light module (1) is designed to emit segmented light distribution with individually controllable light segments (51), wherein the light module (1) comprises a deflection unit (4), with which a native resolution of the light module (1) can be visually increased by at least temporary beam deflection by means of the deflection unit (4), the method comprising:

a) receiving a setpoint image(S), wherein the setpoint image(S) has a resolution that exceeds the native resolution of the light module (1);

b) converting the setpoint image(S) received according to step a) into a first low-resolution image (A) based on a first conversion rule, wherein this first low-resolution image (A) is selected in such a way that it has the native resolution of the light module (1), wherein the first low-resolution image (A) is also selected in such a way that an at least partial visual superimposition with itself produces an image impression more similar to the setpoint image(S) than the reproduction of the first low-resolution image (A) on its own; and c) controlling the light module, wherein it is controlled in such a way that in a first time range (T1), the first low-resolution image (A) converted according to step b) is emitted by the light module (1), wherein in the first time range (T1), the first low-resolution image (A) is recurrently deflected by means of the deflection unit (4) in such a way that the first low-resolution image (A) is at least partially visually superimposed on itself in the first time range (T1).

2. The method according to claim 1, wherein the deflection unit (4) is designed to deflect the first low-resolution image (A) recurrently in the first time range (T1) at a frequency of at least 30 Hz, typically between 30 Hz and 160 Hz.

3. The method according to claim 1, wherein the light module (1) has individually controllable light segments (51), wherein the light distribution is segmented by the individually controllable light segments (51), which are arranged next to each other in a matrix with a resolution of at least two rows and two columns, substantially without gaps.

4. The method according to claim 3, wherein it is provided that a maximum deflection carried out by the deflection unit (4) is designed such that compared to a non-deflected reference state, the deflected state has a vertical and a horizontal offset of half a segment width such that when the maximum amplitude of the deflection is reached—with the exception of edge light segments—each deflected light segment (51) is substantially visually superimposed with four non-deflected light segments (51).

5. The method according to claim 1, wherein the first conversion rule comprises an at least approximate solution of a linear equation system, which linear equation system contains a set of linear equations containing information of the setpoint image(S) with regard to the first low-resolution image (A) in the at least partial superimposition with itself.

6. The method according to claim 1, wherein the first conversion rule is executed by an external computing unit (7).

7. The method according to claim 1, wherein in step b), the setpoint image(S) received according to step a) is additionally converted into a second low-resolution image (B) based on a second conversion rule, wherein the second low-resolution image (B) is selected in such a way that it has the native resolution of the light module (1), wherein the second low-resolution image (B) is also selected in such a way that on its own it has a more similar image impression to the setpoint image(S) than the first low-resolution image (A), wherein in step c), in a second time range (T2), the second low-resolution image (B) is emitted by the light module (1), wherein in the second time range (T2), the second low-resolution image (B) is not deflected recurrently by means of the deflection unit (4).

8. The method according to claim 7, wherein the second conversion rule comprises a scaling method, in which the second low-resolution image (B) is converted entirely from information of the setpoint image(S).

9. The method according to claim 7, wherein the duration and/or the start time of the first time range (T1) and the duration and/or the start time of the second time range (T2) is determined by at least one control parameter, wherein the at least one control parameter contains information on at least one of the following criteria: setpoint light function, ambient temperature, ambient brightness, light module state, vehicle speed.

10. The method according to claim 7, wherein the second conversion rule is executed by an external computing unit (7).

11. The method according to claim 7, wherein the first low-resolution image (A) converted according to step b) and the second low-resolution image (B) converted according to step b) are stored in a storage unit (6) where they can be retrieved before step c) in a partial step b1).

12. The method according to claim 1, wherein the setpoint image(S) has at least one continuous light-dark gradient (C).

13. A light module (1) for a motor vehicle light (10), wherein the light module (1) is designed to emit segmented light distribution, wherein the light module (1) comprises a deflection unit (4), with which a visually perceptible resolution of the light distribution produced by the light module (1) can be increased compared to the native resolution of the light module (1), wherein the light module (1) is designed to be controlled at least according to step c) of the method according to claim 1.

14. The light module (1) according to claim 13, wherein the light module (1) further comprises a storage unit (6) as well as a module control unit (2), wherein the storage unit (6) is designed to store at least one first low-resolution image (A) and at least one second low-resolution image (B), wherein the module control unit (2) is designed to retrieve the first low-resolution image (A) and the second low-resolution image (B) from the storage unit (6) and to emit a light control signal (31) to the light source (3) such that either the first low-resolution image (A) or the second low-resolution image (B) is emitted by the light module (1), and wherein the module control unit (2) is further designed to control the deflection unit (4) in such a way that this recurrently deflects the first low-resolution image (A) when the first low-resolution image (A) is emitted by the light module (1), wherein the module control unit (2) is further designed to control the deflection unit (4) in such a way that this does not recurrently deflect the second low-resolution image (B) when the second low-resolution image (B) is emitted by the light module (1).

15. A motor vehicle (100) having a light module (1) according to claim 13.

16. The method according to claim 6, wherein the first low-resolution image (A) is stored in a storage unit (6) of the light module (1) where it can be retrieved.

17. The method according to claim 12, wherein the setpoint image(S) has a plurality of continuous light-dark gradients (C), which together form a symbol.

* * * * *